United States Patent [19]
Chiu et al.

[11] Patent Number: 5,902,410
[45] Date of Patent: *May 11, 1999

[54] PROCESS FOR PRODUCING AMYLASE RESISTANT GRANULAR STARCH

[75] Inventors: Chung-Wai Chiu, Westfield; Yong-Cheng Shi, Neshanic Station, both of N.J.; Marc Sedam, Chapel Hill, N.C.

[73] Assignee: National Starch and Chemical Investment Holding Corporation, Wilmington, Del.

[*] Notice: This patent is subject to a terminal disclaimer.

[21] Appl. No.: 08/761,690

[22] Filed: Dec. 6, 1996

Related U.S. Application Data

[63] Continuation-in-part of application No. 08/479,073, Jun. 7, 1995, Pat. No. 5,593,503.

[51] Int. Cl.$^6$ ............ C08B 30/00; C08B 30/12; A23G 3/00; A23L 1/05
[52] U.S. Cl. ............ 127/71; 127/32; 127/65; 127/67; 127/69; 426/578; 426/658; 426/661
[58] Field of Search ............ 127/32, 65, 67, 127/69, 71; 426/661, 658, 578

[56] References Cited

U.S. PATENT DOCUMENTS

| | | | |
|---|---|---|---|
| 3,977,897 | 8/1976 | Wurzburg et al. | 127/71 |
| 4,863,655 | 9/1989 | Lacourse et al. | 264/53 |
| 5,051,271 | 9/1991 | Iyengar et al. | 426/658 |
| 5,281,276 | 1/1994 | Chiu et al. | 127/65 |
| 5,409,542 | 4/1995 | Henley et al. | 127/65 |
| 5,480,669 | 1/1996 | Zallie et al. | 426/549 |

FOREIGN PATENT DOCUMENTS

WO 90/15147  12/1990  WIPO ............ C12P 19/14

OTHER PUBLICATIONS

L. Gruchala et al., *Cereal Chemistry*, "Enzyme–Resistant Starch: Studies using Differential Scanning Calorimetry", vol. 70, No. 2, 1993, pp. 163–170. Mar. 1992.

J. Jane, *Starch/Starke*, "Mechanism of Starch Gelatinization in Neutral Salt Solutions", 45, No. 5, 1993, pp. 161–166. Jan. 1993.

C. Knutson, *Cereal Chemistry*, "Annealing of Maize Starches at Elevated Temperatures", vol. 67, No. 4, Feb. 1990, pp. 376–384. Aug. 1989.

R. Hoover et al., *Carbohydrate Research*, "The effects of defatting and heat–moisture treatment on the retrogradation of starch gels from wheat, oat, potato, and lentil", 261, Feb. 1994, pp. 13–24. Month N/A.

R. Hoover et al., *Carbohydrate Research*, "Effect of heat–moisture treatment on the structure and physicochemical properties of cereal, legume, and tuber starches", 252, 1994, pp. 33–53. Month N/A.

A. Kawabata et al., *Starch/Starke*, "Microscopic Observation and X–Ray Diffractometry of Heat/Moisture–Treated Starch Granules", 46, Nr. 12, 1994, pp. 463–469. Mar. 1994.

I. Larsson et al., *Starch/Starke*, "Annealing of Starch at an Intermediate Water Content", 43, Nr. 6, 1991, pp. 227–231. Jan. 1991.

Y. Pomeranz, *European Journal of Clinical Nutrition*, "Research and development regarding enzyme–resistant starch (RS) in the USA: a review", 46 (Suppl. 2), 1992, pp. S63–S68. Month N/A.

*Primary Examiner*—Mark L. Bell
*Assistant Examiner*—Patricia L. Hailey
*Attorney, Agent, or Firm*—Eugene Zagarella, Jr.

[57] ABSTRACT

A resistant granular starch with high dietary fiber content and the method of preparing this product wherein a high amylose starch having at least 40% by weight amylose content and total moisture content of from about 10 to 90% by weight, based on the weight of starch and water is heated in the presence of a starch swelling inhibiting agent, particularly an inorganic salt, to a temperature of from about 60 to 160° C. to provide a granular starch which retains its granular structure and has a total dietary fiber content of at least 12%.

28 Claims, No Drawings

PROCESS FOR PRODUCING AMYLASE RESISTANT GRANULAR STARCH

BACKGROUND OF THE INVENTION

This application is a continuation-in-part of application Ser. No. 08/479,073 filed Jun. 7, 1995, now U.S. Pat. No. 5,593,503.

This invention relates to an improved process for preparing a resistant granular starch with high dietary fiber content. More particularly, this invention involves the preparation of a resistant granular 10 starch by the selected heat treatment of high amylose starch in the presence of a starch swelling inhibiting agent and more particularly an inorganic salt and further to the use of this resistant granular starch in food products.

Starch, a complex carbohydrate, is composed of two types of polysaccharide molecules, amylose, a mostly linear and flexible polymer of D-anhydroglucose units that are linked by alpha-1,4-D-glucosidic bonds, and amylopectin, a branched polymer of short linear chains that are linked by alpha-1,6-D-glucosidic bonds. Starch is digested predominantly in the small intestine by the enzyme alpha-amylase. Alpha-amylase hydrolyzes alpha-1,4-D-glucosidic bonds and therefore hydrolyzes the amylose fraction of starch almost completely to simple sugars. Alpha-amylase does not hydrolyze the alpha-1,6-D-glucosidic linkages, resulting in less complete hydrolysis of the amylopectin fraction.

It is known that certain starch processing operations result in the transformation of starch into starch that is resistant to amylase, known simply as resistant starch. Resistant starch is not digested by amylase in the small intestine, but passes into the large intestine where research literature indicates it behaves with properties similar to dietary fiber. Resistant starch, thus may have reduced caloric value because it resists digestion and is likely to be a factor in prevention of diverticulosis and colon cancer.

Resistant starch (RS) has been classified in the literature into three categories: RS1—physically inaccessible starch (e.g., starch embedded in a protein or fiber matrix, such as starch found in a whole grain); RS2—intact digestion resistant native starch granules (e.g., uncooked potato or banana starch); and RS3—retrograded digestion resistant starch (see Englyst and Cummings, "New Developments in Dietary Fiber", Planum Press, NY 1990).

Various methods have been reported for producing resistant starch. Many of these methods involve the RS3 retrograded type described above, and this follows the general belief that resistant starch is formed when the amylose fraction of starch is retrograded or recrystallized after the gelatinization of starch. The theory is that the flexible linear amylose molecules align themselves after gelatinization into double helices making many of the alpha-1,4-glucoside linkages inaccessible to alpha-amylase.

U.S. Pat. No. 5,051,271 issued Sep. 24, 1991 to R. Iyengar et al. discloses a food grade, non-digestible, low-calorie bulking agent derived from starch and a process for producing it. The process involves retrogradation of starch, followed by enzymatic or chemical hydrolysis to reduce or remove the amorphous regions of the retrograded starch.

WO 90/15147 published Dec. 13, 1990 to Y. Pomeranz et al. discloses a method for preparing purified resistant starch by cooling a cooked starch paste to form a gel, homogenizing the gel in water, digesting away the non-resistant portions with alpha-amylase, and drying the remaining unconverted portion under low temperature.

U.S. Pat. No. 5,281,276 issued Jan. 25, 1994 to Chiu et al. involves a process for producing resistant starch from high amylose starches by gelatinizing a starch slurry, enzymatically debranching the starch, and isolating the starch product by drying or extrusion.

All of the methods described above involve dispersing and gelatinizing starch in large excess amounts of water, followed by retrogradation and the use of enzymes or acids, resulting in RS3-type resistant starch. These methods can be laborious, time consuming and result in low yields and the high water content leads to a costly drying step.

Application Ser. No. 08/479,073 filed Jun. 7, 1995 discloses a method for preparation of resistant granular starch with high dietary fiber content by heating high amylose starch under selected moisture conditions of 10 to 80% by weight total moisture in the starch-water mixture and selected temperature conditions.

This invention is an improvement over that described in the 08/479,073 application noted above and involves the use of a starch swelling inhibiting agent during heat treatment of high amylose starch to provide improved processing characteristics and a resistant granular starch product having a surprising high dietary fiber content level.

SUMMARY OF THE INVENTION

This invention involves an improved method of preparing resistant granular starch with high fiber dietary content by heating high amylose starch under select temperature and moisture conditions and in the presence of a starch swelling inhibiting agent.

More particularly, this invention involves a method of preparing a resistant granular starch with high dietary fiber content by heating a high amylose starch having at least 40% by weight amylose content and total water content of from about 10 to 90% based on the weight of starch and water mixture in the presence of at least 5% by weight of an inorganic salt, based on the weight of starch, dry basis, at a temperature of from about 60 to 160° C.

The invention further involves resistant granular starch prepared in accordance with the above described heat treatment using the addition of starch swelling inhibiting agent or inorganic salt and having a total dietary fiber level of at least 12% and preferably at least 20% by weight.

This invention further relates to food products which contain the resistant granular starch with high dietary fiber content prepared using the treatment as described herein.

DETAILED DESCRIPTION OF THE INVENTION

The term "resistant starch" as used in this application is defined as total dietary fiber content (TDF) as measured by the Prosky et al. method, Journal of Association of Official Analytical Chemists (AOAC), 68, 677 (1985) described below.

In the improved process of this invention, the addition and use of a starch swelling inhibiting agent or inorganic salt during the heating process provides advantageous processing characteristics in that it prevents the granules from swelling and cooking out and is more easily recoverable. Thus, the starch swelling inhibiting agent will help the starch retain its granular structure and birefringent characteristic when heated in the presence of moisture. Furthermore, the TDF level of the resulting resistant starch is found to be higher than that of the starting starch material and more significantly, this process allows a broader range of suitable operating conditions in terms of temperature and moisture conditions.

The starch swelling inhibiting agent that can be used in this invention is any known agent of this type and particularly any inorganic salt such as the food grade salts. More particularly the useful salts are the alkali metal and alkaline earth metal salts such as the salts of sodium, potassium, magnesium and calcium. Also suitable are the aluminum and ammonium salts. Useful salts include the sulfates, halides such as chloride, bromide and iodide, phosphates, nitrates, chlorates, carbonates and acetates. Preferred salts are the sodium and potassium salts particularly the sulfates and chlorides with sodium sulfate being particularly preferred. Also useful starch swelling inhibiting agents are the alcohols or alkanols of 1 to 10 carbon atoms, preferably the alcohols of 2 to 4 carbon atoms such as ethanol and propanol.

When inorganic salt is used in the process of this invention, the amount of salt used will be an effective starch swelling inhibiting amount and that is any amount as long as the starch granules remain intact after heat treatment. This is generally 5% or more by weight of salt, based on the weight of starch, dry basis. More particularly, from about 5% by weight of salt up to the saturation point of the salt in the starch-water mixture, preferably about 10% by weight of salt up to the salt saturation point and more preferably from about 10 to 50% by weight salt, based on the weight of starch, dry basis.

When using an alcohol as the starch swelling inhibiting agent, an alcohol-water mixture will replace the moisture or water that is present in the system, that is, from about 10 to 90% by weight of an alcohol-water mixture can be used based on the total weight of starch and alcohol-water mixture. The amount of alcohol in the alcohol-water mixture can vary and more particularly, the mixture will contain from about 10 to 100% by weight of alcohol. Alcohol can be used alone as a swelling inhibiting agent or it can be combined with an inorganic salt or other swell inhibiting agent.

The starches used in preparing amylase resistant granular starch may be any of several starches, native or modified. More particularly, high amylose starch, i.e., starch containing at least 40% by weight amylose has been found to be most suitable for use in this invention.

It is well known that starch is composed of two fractions, the molecular arrangement of one being essentially linear and the other being highly branched. The linear fraction of starch is known as amylose and the branched fraction amylopectin. Starches from different sources, e.g., potato, corn, tapioca, and rice, etc., are characterized by different relative proportions of the amylose and amylopectin components. Some plant species have been genetically developed which are characterized by a large preponderance of one fraction over the other. For instance, certain varieties of corn which normally contain about 22 to 28% amylose have been developed which yield starch composed of over 40% amylose. These hybrid varieties have been referred to as high amylose or amylomaize.

High amylose corn hybrids were developed in order to naturally provide starches of high amylose content and have been available commercially since about 1963. Suitable high amylose starches useful herein are any starches with an amylose content of at least 40% and preferably at least 65% by weight. While high amylose corn starch has been especially suitable, other starches which are useful include those derived from any plant species which produces or can be made to produce a high amylose content starch, e.g., peas, barley, wheat, potato, tapioca and rice.

The starch material useful in this invention also may include high amylose flour where the starch component of the flour contains at least 40% by weight of amylose. The term starch as used throughout this application is intended to include flour and when the high amylose content of flour is referred to throughout the application and claims, it is understood to refer to the amylose content of the starch component of the flour (e.g., 40% by weight of amylose based on the amount of starch in the flour). Such flour typically comprises protein (about 8 to 13% by weight), lipids (about 2 to 3% by weight) and starches (about 85 to 90% by weight) which include the specified high amylose content.

Another useful high amylose starch is a substantially pure starch extracted from a plant source having an amylose extender genotype, the starch comprising less than 10% by weight amylopectin. This starch which is useful as the starch base material is derived from a plant breeding population, particularly corn, which is a genetic composite of germplasm selections and comprises at least 75% by weight amylose, optionally at least 85% amylose (i.e., normal amylose) as measured by butanol fractionation/exclusion chromatography techniques. The starch further comprises less than 10%, by weight, optionally less than 5%, amylopectin and additionally from about 8 to 25% low molecular weight amylose. The starch is preferably extracted in substantially pure form from the grain of a starch bearing plant having a recessive amylose extender genotype coupled with numerous amylose extender modifier genes. This starch and the method of preparation are described in U.S. Pat. No. 5,300,145 issued to V. Fergason et al. on Apr. 5, 1994, which is incorporated herein by reference.

The starch used in this invention may be unmodified or modified. Chemically modified starches include the conversion products derived from any of the former bases, for example, starch prepared by hydrolytic actions of acid and/or heat; oxidized starches prepared by treatment with oxidants such as sodium hypochlorite; fluidity or thin boiling starches prepared by enzyme conversion or mild acid hydrolysis; and derivatized and crosslinked starches.

By using inorganic salt or other starch swelling inhibiting agents, the starch will not cook out at high temperatures even when at high moisture levels. Therefore, this method provides a broad range of temperature and moisture conditions at which it can be carried out in order to prepare the desired resistant granular starch products.

The total moisture or water content of the starch to be heat treated will be in a range of from about 10 to 90% by weight, preferably 20 to 70% by weight, based on the total weight of starch and water mixture in the system. Total moisture or water content is defined as the percent of water based on the total weight of starch and water in the system.

The starch with selected moisture content is heated at a temperature of from about 60 to 160° C. The desired temperature will vary depending on moisture conditions. When using salt and high total moisture of 50 to 90%, the preferred temperature will be from about 60 to 110° C. whereas when using salt and low total moisture of 20 to 50%, the preferred temperature is from about 80 to 160° C. The preferred temperature when using alcohol is from about 95 to 150° C. While the most desirable temperature may vary slightly depending on the particular starch and amylose content, it is important the starch remain in the granular form and not lose its birefringent characteristic. Also, the time of heating can vary depending on the starch used, its amylose content, the level of total dietary fiber content desired as well as the amount of moisture and the heating temperature. Typically the heating time will be from about 0.5 to 72 hours and preferably from about 5 to 48 hours. It has also been found advantageous to use a multi-step or stepwise heating procedure wherein the starch system is heated to the final desired temperature in two or more steps. This further improves processing characteristics by allowing a better starch granule structure to form, i.e., it preserves and perfects the crystallite structure of the starch. This aids in processing by further preventing swelling to develop and allows for better or easier filterability of the products. The stepwise procedure can also include cooling steps, at e.g. 5 to 40° C., between the heating steps. In other words, heating-cooling cycles can be utilized.

The most desired conditions for treating starch to obtain a high level of total dietary fiber are such that the granular structure of the starch is not destroyed and the granules are still birefringent. However, there may be some conditions such as at high moisture and high temperature where the starch granule may be partially swollen but the crystallinity is not completely destroyed. Under these conditions, the starch granule has not been completely destroyed and an increase in total dietary fiber may still be obtained in accordance with this invention. Accordingly, the term "granular starch" as used herein, includes starch which predominantly retains its granular structure and has some crystallinity.

After the heat treatment, the starch may be washed with water to remove the salt or other starch swelling inhibiting agent, and allowed to air dry to reach equilibrium moisture conditions or may be dried using a flash dryer or other drying means.

The resulting starch product which has been heated under defined conditions as described will still have a granular structure as evidenced by its birefringent characteristic when viewed under the microscope. The granular resistant starch product will have a total dietary content of at least 12%, preferably at least 20% and more preferably at least 30% by weight. The amount of total dietary fiber or resistant starch content is determined using a standard procedure developed by Prosky et al., Journal of Association of Official Analytical Chemists (AOAC), 68, 677 (1985) as described below. The level of dietary fiber content of the starch will vary depending on the conditions used as well as the particular starch starting material.

The resulting granular starch product is also characterized by an onset melting temperature of at least about 70° C. and preferably at least about 90° C. as shown by differential scanning calorimetry (DSC) using a method described below.

The granular resistant starch of this invention has improved or enhanced TDF of at least 10% greater than the untreated or starting base starch, i.e., unmodified or modified, and an increased onset melting temperatures of at least 10° C. greater than the untreated or starting base starch, i.e., unmodified or modified as measured by DSC. More particularly, the granular resistant starch of this invention has improved TDF of at least 20% greater than the untreated or starting base starch, preferably at least 30% greater and an onset melting temperature of at least 10° C. greater than the untreated or starting base starch, preferably at least 20° C. greater. A particularly desirable granular resistant starch in accordance with this invention is one having a TDF of at least 30%, preferably at least 40%, and an onset melting temperature of at least 90° C.

The granular resistant starch product of this invention can be added to foods to contribute to the total dietary fiber present in the foods. Typical food products where the starch product can be added as a dietary fiber supplement include cereals such as ready-to-eat, puffed or expanded cereals and cereals which are cooked before eating; baked goods such as breads, crackers, cookies, cakes, muffins, rolls, pastries and other grain-based ingredients; pasta; beverages; fried and coated foods, snacks; etc.

The amount of granular resistant starch and dietary fiber which can be added and used in any given food will be determined to a great extent by the amount that can be tolerated from a functional standpoint. In other words, the amount of granular resistant starch and fiber used generally will be as high as will be acceptable in organoleptic evaluation of the food. Generally the granular resistant starch may be used in food applications at about 0.1 to 50%, by weight of the food and more particularly from about 1 to 25% by weight.

This invention is further illustrated by the following examples with all parts and percentages given by weight and all temperatures in degrees Celsius unless otherwise noted.

The following test procedures were used in evaluating the various resistant starch products made in accordance with this invention.

A. Total Dietary Fiber Determination

The following procedure outlines the Prosky Method for determining dietary fiber or resistant starch in foods according to Prosky et al., J. Assoc. Off. Anal. Chem., 68, 677 (1985).

Reagents:
(a) Ethanol 95% v/v, technical grade.
(b) Ethanol 78%. Place 207 ml $H_2O$ into 1 L volume flask. Dilute to volume with 95% EtOH. Mix and dilute to volume again with 95% EtOH if necessary. Mix.
(c) Acetone, reagent grade.
(d) Phosphate buffer, 0.05 M, pH 6.0. Dissolve 0.875 g Na phosphate dibasic, anhydride ($Na_2HPO_4$) (or 1.097 g dihydrate) and 6.05 g Na phosphate monobasic monohydrate ($NaH_2PO_4$) (or 6.8 g dihydrate) in ca 700 ml $H_2O$. Dilute to 1 L with $H_2$0. Check pH with pH meter.
(e) Termamyl (heat stable alpha-amylase) solution—No. 120 L, Novo Laboratories, Inc., Wilton, Conn. 06897. Keep refrigerated.
(f) Protease. No. P-5380, Sigma Chemical Company. Keep refrigerated.
(g) Amyloglucosidase. No. A-9268, Sigma Chemical Company. Keep refrigerated.

Alternatively, a kit containing all 3 enzymes (pretested) is available from Sigma Chemical Company, Catalog No. KR-185.

(h) Sodium hydroxide solution, 0.171 N. Dissolve 6.84 g NaOH ACS in ca 700 ml $H_2O$ in 1 L volume flask. Dilute to volume with $H_2O$.
(i) Phosphoric acid solution, 0.205 M. Dissolve 23.6 g $H_3PO_4$ ACS (85%) in $H_2O$ in 1 L volume flask. Dilute to volume with $H_2O$.
(j) Celite C-211, acid-washed. Fisher Scientific Company.

Method:
Run blank through entire procedure along with samples to measure any contribution from reagents to residue.

Homogenize sample and dry overnight in 70° C. vacuum oven, cool in desiccator, and dry-mill portion of sample to 0.3 to 0.5 mm mesh.

Weigh duplicate 1 g samples, accurate to 0.1 mg, into 400 ml, tall-form beakers. Sample weights should not differ by 20 mg. Add 50 ml pH 6.0 phosphate buffer to each beaker. Check pH and adjust if necessary. Add 0.1 ml Termanyl solution. Cover beaker with aluminum foil and place in boiling $H_2O$ bath 15 minutes. Shake gently at 5 minute intervals. Increase incubation time when number of beakers in boiling $H_2O$ bath makes it difficult for beaker contents to reach internal temperature of 100° C. Use thermometer to ascertain that 100° C. is attained at 15 minutes. Total of 30 minutes in $H_2O$ bath should be sufficient.

Cool solutions to room temperature. Adjust to pH 7.5±0.1 by adding 10 ml 0.171 N NaOH solution.

Add 5 mg protease. (Protease sticks to spatula, so it may be preferable to prepare enzyme solution just before use with ca 0.1 ml phosphate buffer and pipette required amount).

Cover beaker with aluminum foil. Incubate 30 minutes at 60° C. (Measure volume before heating.) Let precipitate form at room temperature for 60 minutes.

Weigh crucible containing Celite to nearest 0.1 mg, then wet and redistribute bed of Celite in crucible by using stream of 79% EtOH from wash bottle. Apply suction to draw Celite onto fritted glass as even mat. Maintain suction and quantitatively transfer precipitate from enzyme digest to crucible.

Wash residue successively with three 20 ml portions of 78% EtOH, two 10 ml portions of 95% EtOH, and two 10 ml portions of acetone. Gum may form with some samples, trapping liquid. If so, break surface with spatula to improve filtration. Time for filtration and washing will vary from 0.1 to 6 hours, averaging 1.2 hour per sample. Long filtration times can be avoided by careful intermittent suction throughout filtration.

Dry crucible containing residue overnight in 70° C. vacuum oven or 105° C. air oven. Cool in desiccator and weight to nearest 0.1 mg. Subtract crucible and Celite weight to determine weight of residue.

Analyze residue from sample of set of duplicates for protein and ash. Subtract protein and ash values from residue to obtain total dietary fiber (TDF) or amount of resistant starch.

Determination of $TDF(\%)$:

$$\text{Blank} = \text{mg blank residue} - \frac{\left(\% \text{ protein in blank} + \% \text{ ash in blank}\right) \times \text{mg blank residue}}{100}$$

Determination of $TDF(\%)$:

$$TDF\% = \text{mg residue} - \frac{\left[\left(\% \text{ protein in residue} + \% \text{ ash in residue}\right) \times \text{mg residue}\right] - \text{blank}}{\text{mg sample (wt)}} \times 100$$

B. Differential Scanning Calorimetry (DSC)

The following procedure was used for obtaining differential scanning calorimetry (DSC) data. DSC measurements were performed on each of the samples with a Perkin-Elmer DSC-7 instrument (Perkin-Elmer Corporation, Instrument Division, Norwalk, Connecticut). Starch samples of 10 mg were weighed accurately into a Perkin-Elmer stainless steel pan. About 40 mg of deionized water was added and the pan sealed and allowed to equilibrate overnight at 4° C. The DSC scan was run from 200 to 180° C. at 10° C./minute heating rate. An empty pan represented the reference sample.

EXAMPLE 1

A 100 g sample of Hylon® VII maize starch (10.5% moisture), a product of National Starch and Chemical Company containing about 70% by weight amylose content, was added to three hundred (300) g of water in a container. The starch and water was mixed at room temperature for 10 minutes and the slurry was then heated to 95° C. with continued agitation for 48 hours. The slurry became very pasty and was not recoverable by standard filtration techniques for granular starch.

The same starch sample as above, i.e., 70% amylose maize starch was mixed with varying amounts of water and sodium sulfate salt, and then heated at the temperatures and times designated in the following table. Samples were taken, filtered and washed to remove residual salt and then analyzed for total dietary fiber content (TDF) using the Prosky method as previously described above.

TABLE 1

| Sample | Component (Parts) | | | Temperature ° C. | Time (hr) | TDF % |
|---|---|---|---|---|---|---|
| | Starch (dry basis) | $H_2O$ | Salt | | | |
| A (Untreated Hylon VII) | | | | | | 16 |
| B | 15 | 85 | 7.5 | 50 | 20 | 15 |
| C | 15 | 85 | 7.5 | 50 | 60 | 15 |
| D | 15 | 85 | 7.5 | 90 | 20 | 22 |
| E | 15 | 85 | 7.5 | 90 | 60 | 40 |
| F | 30 | 70 | 7.5 | 70 | 40 | 27 |
| G | 30 | 70 | 6 | 95 | 20 | 34 |
| H | 30 | 70 | 15 | 95 | 76 | 47 |
| I | 35 | 65 | 0 | 90 | 48 | —[1] |
| J | 35 | 65 | 8.75 | 90 | 48 | 42 |
| K | 40 | 60 | 8 | 85 | 30 | 32 |
| L | 40 | 60 | 20 | 90 | 20 | 36 |
| M | 40 | 60 | 6.7 | 90 | 60 | 40 |
| N | 40 | 60 | 20 | 95 | 30 | 35 |
| O | 40 | 60 | 8 | 95 | 76 | 46 |

[1]material was cooked out and difficult to recover.

The examples show the TDF of the high amylose starch is increased after heating in the presence of sodium sulfate in various concentrations and temperatures.

EXAMPLE 2

Starch samples with varying amounts of amylose were heated in the presence of sodium sulfate under conditions shown below in Table 2 in the manner described in Example 1. The starch samples were Hylon V, a starch product of National Starch and Chemical Company, having about 50% amylose content and VJR starch having high amylose (normal) 78.3% and low molecular weight amylose 18.7% bred as described herein and further in U.S. Pat. No. 5,300,145 issued Apr. 5, 1994.

TABLE 2

| Sample | Component (Parts) Starch (dry basis) | H$_2$O | Salt | Temperature °C. | Time (hrs) | TDF % |
|---|---|---|---|---|---|---|
| Untreated Hylon V | | | | | | 5 |
| Hylon V (50% amylose) | 35 | 65 | 0 | 90 | 24 | 0 |
| Hylon V (50% amylose) | 35 | 65 | 8.75 | 90 | 24 | 12.5 |
| Hylon V (50% amylose) | 35 | 65 | 8.75 | 90 | 48 | 13.5 |
| Untreated VJR | | | | | | 22 |
| VJR | 35 | 65 | 8.75 | 95 | 6 | 45 |
| VJR | 35 | 65 | 8.75 | 95 | 24 | 54 |

The above results show the ability to increase TDF when using salt with starch having varying amounts of amylose content.

EXAMPLE 3

This example shows the increase of TDF of an acetylated Hylon VII starch (70% amylose) after being heat treated in the presence of sodium sulfate with 46.5% total moisture.

An acetylated (1% acetic anhydride treatment) Hylon VII starch (1116 g, 10.6% moisture) was placed in a Ross Mixer, a double planetary mixer with standard blades (product of Charles Ross and Son Company), and a salt solution containing 250 g of sodium sulfate and 750 ml of water added to the starch. The mixer was closed and the starch and salt solution mixed at room temperature for 1 0 minutes.

This provided a sample with 46.5% total moisture content by weight. The temperature was increased to 98° C. with continued mixing and kept at that temperature for 4 hours. The mixer was opened and cooled to 30° C. Half of the sample (about 500 g) was taken out and slurried in 1200 ml of water, the slurry filtered on a Bucher funnel and washed with 1500 ml of water twice. The finished filter cake was air-dried and analyzed for TDF as in Example 1. The heat treated, acetylated Hylon VI had a TDF of 48.0%.

EXAMPLE 4

This example shows the increase of TDF of an acelyated Hylon VII starch (70% amylose) after being heat treated in the presence of sodium sulfate with 77.7% total moisture. One hundred (100) g of a 70% amylose maize acetate starch (treated with 19% acetic anhydride) was added to 300 g of water containing 25 g sodium sulfate. The slurry was mixed and allowed to heat at 95° C. under agitation and held for periods 24 and 48 hours (2 samples). The dietary fiber content (TDF) of the purified products was 33 and 41% respectively.

EXAMPLE 5

Samples of high amylose starch, i.e., Hylon VII maize starch containing 70% by weight of amylose, were heated in the presence of sodium sulfate as in Example 1 but using two or multiple steps to heat the mixture under the conditions described in Table 3 below. The samples had 25% sodium sulfate by weight based on starch, i.e., 4:1, starch:sodium sulfate and 35% starch in water. The samples were all heated to 75° C. and held there as specified and further heated to 90° C. and some to 95° C. as specified. The samples were analyzed for total dietary fiber content (TDF) using the Prosky method and for differential scanning calorimetry (DSC) data, using procedures described above. The results shown below in Table 3 indicate the ability to increase TDF when using the multi-step heating procedure. Results also show the ability to increase onset melting temperatures To, when using this procedure. Also shown are peak temperatures Tp, concluding temperatures Tc and Delta H, or energy needed to gelatinize or melt the starch product.

TABLE 3

| Sample | Heating Conditions | % TDF | To (° C.) | Tp (° C.) | Tc (° C.) | Delta H (J/g) |
|---|---|---|---|---|---|---|
| Hylon VII (untreated) | | 16.0 | 70.4 | 90.3 | 126.5 | 18.69 |
| 1 | 1 hr at 75° C. | 24.0 | 74.6 | 89.8 | 109.6 | 16.59 |
| 2 | 1 hr at 75° C. 1 hr at 90° C. | 26.0 | 86.2 | 96.1 | 128.2 | 19.24 |
| 3 | 1 hr at 75° C. 4 hr at 90° C. | 29.5 | 88.8 | 98.4 | 128.8 | 18.72 |
| 4 | 1 hr at 75° C. 6 hr at 90° C. | 29.0 | 89.1 | 100.1 | 128.8 | 18.68 |
| 5 | 1 hr at 75° C. 24 hr at 90° C. | 33.0 | 90.3 | 101.5 | 129.0 | 19.90 |
| 6 | 1 hr at 75° C. 48 hr at 90° C. | 39.0 | 91.6 | 102.2 | 127.8 | 18.8 |
| 7 | 1 hr at 75° C. 1 hr at 90° C. 1 hr at 95° C. | 29.5 | 90.3 | 100.0 | 129.2 | 18.14 |
| 8 | 1 hr at 75° C. 1 hr at 90° C. 5 hr at 95° C. | 30.0 | 90.3 | 100.7 | 129.0 | 18.02 |
| 9 | 1 hr at 75° C. 1 hr at 90° C. 23 hr at 95° C. | 43.0 | 2.55 9 | 103.6 | 128.0 | 16.8 |
| 10 | 1 hr at 75° C. 1 hr at 90° C. 47 hr at 95° C. | 47.0 | 95.1 | 104.7 | 133.8 | 18.5 |

EXAMPLE 6

Samples of high amylose starch, i.e., 70% amylose maize starch were treated and prepared as in Example 1 using different salts and conditions as described below and giving the indicated TDF values.

| Starch (dry basis) | Component Parts H$_2$O | Salt | Temp. °C. | Time hrs | TDF % |
|---|---|---|---|---|---|
| Hylon VII (control) | | | | | 16 |
| Hylon VII 70% amylose (35) | 65 | MgSO$_4$ (8.75) | 90 | 24 | 33 |
| Hylon VII 70% amylose (35) | 65 | MgSO$_4$ (8.75) | 90 | 48 | 34 |
| Hylon VII 70% amylose (35) | 65 | Al$_2$(SO$_4$)$_3$ (8.75) | 90 | 48 | >60 |

EXAMPLE 7

This example illustrates the TDF of a high amylose granular starch can be further increased by enzyme digestion. One hundred (100) g of heat treated high amylose starch (70% amylose maize starch) prepared as in Example 1 (Sample J) was slurried in 200 ml of water and 1 g of alpha-amylase (Fungamyl, Novo Nordisk) added. The mixture was allowed to react at 37° C. under good agitation. Samples were taken at different incubation time, filtered, washed and fiber content determined. The examples showed an increase in TDF after enzyme digestion. The TDF after 52 hours treatment increased from 42% to 54%.

EXAMPLE 8

This example illustrates the usefulness of an alcohol as a swelling inhibiting agent thus allowing the heat-moisture process to proceed and generate a granular starch product with improved TDF. The starch used was a Hylon VII maize starch with 70% by weight amylose content as in Example 1. The alcohols used were ethanol (ETOH) and isopropanol. The results are shown below:

| Component Parts | | | | | | | |
|---|---|---|---|---|---|---|---|
| Starch | H$_2$O | ETOH | Isopropanol | Na$_2$SO$_4$ | Temp. °C. | Time hrs. | TDF % |
| Hylon VII (Control) | | | | | | | 16 |
| 280 | 104 | 416 | — | — | 110 | 48 | 26 |
| 280 | 104 | 416 | — | 14 | 110 | 5 | 26 |
| 280 | 104 | 416 | — | 14 | 110 | 24 | 29 |
| 280 | 104 | — | 416 | 14 | 95 | 0 | 16 |
| 280 | 104 | — | 416 | 14 | 95 | 5 | 23 |
| 280 | 104 | — | 416 | 14 | 95 | 48 | 28 |

EXAMPLE 9

A sample of Hylon VII starch (70% amylose) is prepared and heated treated with sodium sulfate Example, Sample J (90° C., 48 hours) and evaluated as an ingredient in oatmeal cookies.

| Test Formulation - Oatmeal Cookies | | |
|---|---|---|
| Ingredients | | Amount % |
| A. | Baka-Snak | 1.75 |
| | Test Starch | 6.00 |
| | Quick Cooking Rolled Oats | 21.65 |
| | Brown Sugar | 14.10 |
| | Flour | 13.20 |
| | Granulated Sugar | 11.70 |
| | Baking Soda | 0.40 |
| B. | Butter or Margarine | 21.00 |
| | Eggs | 10.20 |
| | | 100.00% |

Preparation:
1. Mix all ingredients in A to uniform consistency
2. Cream butter in B
3. Add dry mix of A and slightly beaten eggs to butter. Blend to a uniform consistency.
4. Drop by teaspoonfuls onto an ungreased cookie sheet. bake 10 to 12 minutes at 350° F.

The prepared cookie products containing the resistant starch of this invention is an acceptable product and with more spread than a control formulation prepared with increased rolled oats, and suitable taste.

EXAMPLE 10

A typical yellow cake containing the granular resistant starch of this invention and thus providing a fiber fortified cake is prepared having the following formulation:

| Cake Formulation | |
|---|---|
| Ingredient | Amount (g) |
| Sugar | 237 |
| Shortening | 64 |
| Vanilla | 1.5 |
| Instant Pure-Flo F | 10.5 |
| Cake Flour | 156.6 |

| Cake Formulation -continued | |
|---|---|
| Ingredient | Amount (g) |
| Sample Starch/Fiber | 7.4 |
| NFDM | 14 |
| Baking Powder | 5.5 |
| Salt | 3.5 |
| Whole Eggs | 100 |
| Water | 120 |
| Oil | 110 |
| Total | 830 |

The cake is prepared as described below using the Hylon VII, high amylose starch prepared in Example 1, Sample J. The cake is prepared as follows. The shortening is placed in mixer bowl and whipped slightly. The sugar is added and the blend mixed until uniform and light. The vanilla is then added. A dry mix of the starch, NFDM, baking powder and salt is made. Half the dry mix is added to the eggs, water and oil and blended to wet ingredients. The remaining dry mix is added, blended and mixed for 2 minutes on medium speed. The prepared formulation is then baked and the resulting cake products observed. The results show that acceptable cakes with suitable taste are made using the added granular resistant starch/fiber of this invention.

EXAMPLE 11

A sports beverage is prepared by adding 5.96 g of Hylon VII starch prepared as in Example 1, Sample J to 946 g Gatorade fruit punch. The beverage product is heated to 185° F. and hot filled into a beverage container. The beverage is then stored in a refrigerator until evaluation. Another beverage is prepared in a similar manner using 6.19 g of VJR starch prepared as in Example 2 (TDF of 54.0%).

The beverages with the added starch fiber show no adverse flavor or mouthfeel and the results indicate that the starch products are useful in viscous type beverages.

What is claimed is:

1. A method for preparing a resistant granular starch with increased total dietary fiber content by heating a high amylose starch having at least 40% by weight amylose content in the presence of at least 5% by weight, based on the weight of starch, dry basis, of a starch swelling inhibiting agent under a combination of moisture and temperature conditions such that the starch remains in the granular state and is birefringent, the total moisture content of the starch to be heated being from about 10 to 90% by weight based on the weight of starch and water mixture, and the temperature being from about 60 to 160° C., with the resulting resistant granular starch having a total dietary fiber content of at least 12%.

2. The method of claim 1 wherein the inhibiting agent is an inorganic salt.

3. The method of claim 2 wherein the salt is used in an amount of from about 5% by weight, based on the weight of starch, dry basis, up to the salt saturation point.

4. The method of claim 3 wherein the high amylose starch has at least 65% by weight amylose content.

5. The method of claim 4 wherein the total dietary fiber content is at least 20%.

6. The resistant granular starch made by the method of claim 3.

7. The method of claim 2 wherein the total moisture content of the starch is from about 50 to 90% by weight and the temperature is from about 60 to 110° C.

8. The method of claim 2 wherein the total moisture content is from about 20 to 50% by weight and the temperature is from about 80 to 160° C.

9. The method of claim 2 wherein the inorganic salt is selected from the group consisting of alkali metal and alkaline earth metal salts.

10. The method of claim 9 wherein the salt is used in an amount of from about 5% by weight of salt, based on the weight of starch dry basis, up to the salt saturation point.

11. The method of claim 10 wherein the total moisture content of the starch is from about 50 to 90% by weight and the temperature is from about 60 to 110° C.

12. The method of claim 10 wherein the total moisture content of the starch is from about 20 to 50% by weight and the temperature is from about 80 to 160° C.

13. The method of claim 10 wherein the high amylose starch has at least 65% by weight amylose content and the total dietary fiber content is at least 20%.

14. The method of claim 10 wherein the inorganic salt is selected from the group consisting of sodium sulfate, sodium chloride, potassium sulfate and potassium chloride.

15. The method of claim 10 wherein the high amylose starch is modified.

16. The method of claim 10 wherein the starch is heated using a stepwise procedure of increased temperatures until the final heating temperature is reached.

17. The method of claim 10 wherein the salt used is sodium sulfate.

18. The resistant granular starch made by the method of claim 17.

19. The resistant granular starch made by the method of claim 10.

20. The method of claim 1 wherein the starch swelling inhibiting agent is an alcohol.

21. The resistant granular starch made by the method of claim 1.

22. A food product containing a resistant granular starch made by the method of claim 1.

23. The food product of claim 22 wherein the inhibiting agent is an inorganic salt.

24. The food product of claim 23 wherein the inorganic salt is selected from the group consisting of alkali metal and alkaline earth metal salts.

25. The food product of claim 24 wherein the salt is used in an amount of from about 5% by weight based on the weight of starch, dry basis, up to the salt saturation point.

26. The food product of claim 25 wherein the salt is sodium sulfate and the total dietary fiber content is at least 20%.

27. A resistant granular starch having an amylose content of at least 40% by weight, an improved total dietary fiber content of at least 10% greater than the starting base starch and an increased onset melting temperature of at least 10° C. greater than starting base starch.

28. A resistant granular starch having an amylose content of at least 40% by weight, a total dietary fiber content of at least 30% and an onset melting temperature of at least 90° C.

* * * * *